United States Patent Office 3,006,960
Patented Oct. 31, 1961

3,006,960
PREPARATION OF ALKOXYALDEHYDES
Daniel B. Luten, Jr., Berkeley, and Jan O. Konecny, Oakland, Calif., assignors to Shell Oil Company, a corporation of Delaware
No Drawing. Filed Aug. 19, 1959, Ser. No. 834,659
8 Claims. (Cl. 260—602)

This invention pertains to an improved process for the preparation of beta-ether-substituted aldehydes by the addition of alcohols to the olefinic double bond of acrolein.

It has long been known that alcohols can be added to the olefinic double bond of acrolein to form beta-ether-substituted propionaldehydes. However, preparation of these ether-aldehydes by this reaction has been found to be very difficult, as a practical matter. Both the olefinic double bond and the aldehyde group of acrolein are highly reactive, so that a number of reactions are possible—and most have been found to occur—in a reaction system containing both an alcohol and acrolein. If the reaction system becomes more than slightly acid, the predominant product is the acetal resulting from reaction of three molecules of the alcohol with one molecule of the acrolein, while if the reaction mixture is more than slightly basic, various reactions involving condensation and/or polymerization of the acrolein and/or the alcohol occur to a major extent. Even under mildly acid conditions, the ether-aldehyde tends to undergo aldol condensation.

It has been proposed to react the alcohol and acrolein in systems in which the pH is carefully controlled to maintain the system in a neutral to slightly acid condition. Thus it has been proposed to react the alcohol and acrolein in the presence of an amine as catalyst, in a reaction medium in which the pH is carefully controlled to maintain that medium in a neutral to slightly acid condition. The pH of a given medium is controlled by choosing an amphoteric amine which will provide the required pH, or by employing a basic amine and adding a carboxylic acid in the amount necessary to provide the required pH. It has been found that these proposed processes are subject to serious disadvantages when employed on a large scale. First, while such a system provides high yields of the desired beta-ether-substituted propionaldehydes, the conversion of acrolein to the ether-aldehydes which can be obtained in such a system is rather low, in most cases not exceeding about 75% of the acrolein charged. Such a reaction system accordingly requires separation of unreacted acrolein and its recycle. Such a procedure is undesirable, since special precautions are required in effecting separation of the unreacted acrolein to prevent reversion of the ether-aldehyde to the precursor alcohol and acrolein. Also, recycle of the reactive acrolein desirably is avoided. Second, it has been found that the separation and recovery of a pure alkoxy-aldehyde product from the catalyst is very difficult in most, if not all cases. The ether-aldehyde product ordinarily is recovered from the final reaction mixture by distillation techniques. The amine salts of the carboxylic acids formed from the amines and the carboxylic acids often are unstable, decomposing into the precursor amines and carboxylic acids. Further, in many cases the amines and/or the carboxylic acids involved tend to be volatile under the conditions present during recovery of the ether-aldehyde product by distillation of the final reaction mixtures, so that the ether-aldehyde product almost always is contaminated by the amines and/or the acids. Thus, where there is involved an amine and/or acid whose boiling point is below, or very near, the boiling point of the product ether-aldehyde, or, as often happens, where the amine and/or acid forms an azeotrope with a component or components of the final reaction mixture such that the amine and/or acid is distilled overhead with the product ether-aldehyde, it is very difficult to prevent contamination of the product by the amine and/or the acid. In such cases, at least an additional recovery step, to remove the amines and/or the acids from the products, is required to obtain pure products. Often, separation of the ether-aldehyde products from the amines and/or acids presents serious difficulties. In particular, amines catalyze reversion of beta-ether-substituted propionaldehydes to form their precursor alcohols and acrolein. Further, the presence of the amine in the product ether-aldehyde causes that product to be unstable. Thus, to obtain a pure, stable product, either elaborate recovery procedures must be used to prevent contamination of the ether-aldehyde products by amines and/or acids, or substantial reversion of the ether-aldehyde products during separation of the products from the contaminating amines must be accepted.

While contamination of the ether-aldehyde products by the amines and/or carboxylic acids involved can be avoided by employing amines and carboxylic acids which are not volatile, in the sense contemplated herein, or by employing a stable, non-volatile amphoteric amine, it is an unfortunate fact that the suitable non-volatile amines, and/or carboxylic acids and/or amphoteric amines are not readily available in substantial quantities at prices which make their use economically attractive. As a practical matter, therefore, one wishing to add an alcohol to acrolein by these proposed processes is forced to make a choice between two unattractive alternates: (1) employment of a cheap, readily available catalyst, which will cause contamination of the product unless elaborate precautions to avoid the contamination are taken, or (2) employment of a catalyst which will not cause contamination of the product but which is so expensive as to be unattractive economically. As a practical matter, the proposed processes thus leave much to be desired.

A further proposal, which does not involve the use of amine-carboxylic acid salt catalyst systems, involves the use of two reaction stages: In a first stage acrolein is reacted with an alcohol in the presence of a controlled limited amount of a strong base; in a second stage, a controlled amount of acid is added to provide and maintain the pH of the reaction mixture within a limited acid range. The reaction mixture then is rapidly distilled to recover the ether-aldehyde product. Such a process also is subject to substantial disadvantages when used on a large scale: the amount of base used in the first stage and the amount of acid used in the second stage must be carefully controlled to avoid extensive side reactions which result in the formation of products of no known value. Further, the reaction conditions, particularly in the first stage, must be carefully controlled for the same reason. Such careful control of reaction variables within limited ranges is very difficult to achieve on any substantial scale.

We have now discovered a process for effecting addition of alcohols to the olefinic double bond of acrolein which avoids the aforementioned disadvantages of the prior art processes for effecting such additions. The new process is characterized by efficient addition of the alcohol to acrolein to yield the corresponding beta-ether-substituted propionaldehyde as substantially the only product, with virtually no undesirable, useless by-products being produced. The new process employs stable catalysts of such character that recovery of an uncontaminated product is easily accomplished. The catalyst used provides a buffered reaction system, so that only ordinary care is required to maintain the necessary process conditions.

Briefly stated, we have found that if an alcohol is reacted in liquid phase with acrolein in the presence of a catalyst comprising a mixture of at least one beta-alkoxy-carboxylic acid and at least one alkali metal salt of such an acid, substantially the only reaction which occurs is the addition of the alcohol to the olefinic double bond of the acrolein so that substantially the only product of the reaction is the beta-ether-substituted propionaldehyde corresponding to the alcohol. These acid-salt mixtures are stable in the reaction mixture. The salt is non-volatile. The acid is volatile, but the acid corresponding to the ether-aldehyde boils at a temperature substantially different from that at which the ether-aldehyde boils. The acid is not a catalyst for either the reversion or the decomposition of the ether-aldehyde. Consequently, recovery of the product ether-aldehyde ordinarily can be effected efficiently and conveniently by distillation without significant loss of the product due to chemical degradation. Our discoveries thus provide a process which lends itself admirably to the large-scale production of beta-ether-substituted propionaldehydes from alcohols and acrolein.

The process which embodies our discoveries effects selective addition of alcohols to the olefinic double bond of acrolein. It is preferred, of course, that the alcohol chosen in any particular instance be free from substituent groups other than the alcoholic hydroxyl group or groups which are reactive with acrolein under the process conditions, so that undesirable side reactions will not occur. For this reason and because of the desirability of the ether-aldehydes prepared therefrom, the process which we have discovered is of particular value for addition to acrolein of aliphatic alcohols containing only carbon, oxygen and hydrogen atoms. The two principal groups of these alcohols are the unsubstituted alcohols containing, in addition to one or more alcoholic hydroxyl groups, only carbon and hydrogen atoms, and the ether-alcohols—that is, alcohols containing one or more oxy (–O–) linkages. While the suitable alcohols may be either saturated or unsaturated, it is preferred that the alcohol used be free from acetylenic unsaturation; thus the saturated and olefinically—either mono- or polyolefinically—unsaturated alcohols are preferred. The suitable alcohols can be either straight-chain or branched-chain in configuration, and may contain in their structure either or both of alicyclic or aromatic carbon-to-carbon moieties. While all of primary, secondary and tertiary alcohols are suitable, the alcohols containing at least one hydrogen atom bonded to a carbon atom to which an alcoholic hydroxyl group is bonded—that is, the primary and secondary alcohols—are most reactive, and are most suitable for this reason. The primary monohydric aliphatic alcohols are the most reactive. Examples of suitable alcohols thus include methanol, ethanol, n-propanol, n-butanol, n-hexanol, 1-octanol, 2-ethyl-1-hexanol, 1-decanol, lauryl, myristyl and cetyl alcohols and like high molecular weight aliphatic alcohols, such as tallow alcohols and fat alcohols, ethylene glycol, propylene glycol and like straight-chain primary alkanols, isobutyl alcohol, isoamyl alcohol, sec-butylcarbinol and like branched-chain primary alkanols, isopropyl alcohol, sec-butyl alcohol, sec-amyl alcohol, 2-octanol, 5-ethyl-2-nonanol, 7-ethyl-2-methyl-4-undecanol, 3,9-diethyl-6-tridecanol, cyclohexanol and like secondary alcohols, tert-butyl alcohol, tert-amyl alcohol and like tertiary alcohols, benzyl alcohol, phenethyl alcohol and like aralkyl primary alkanols, cyclohexylcarbinol, 2-cyclohexyl-ethan-1-ol and like alicyclic-substituted primary alkanols, allyl alcohol, crotyl alcohol, allylcarbinol, propenylcarbinol, cinnamic alcohol, 4-pentenol, oleyl alcohol, linoleyl alcohol, 2,4-pentadien-1-ol, 2,4-hexadienol and like alkenols and alkapolydienols, methoxymethanol, 2-methoxyethanol, ethoxymethanol, 2-butyloxyethanol, 2-(2-methoxyethoxy)-ethanol, 2-allyloxyethanol, 2-benzyloxymethanol, 2-phenoxyethanol, diethylene glycol and like ether-alcohols. Of particular interest because of the properties of the beta-aliphaticoxy-propionaldehyde prepared therefrom are the primary monohydric aliphatic alcohols as herein described which contain from 1 to 25 carbon atoms, and of this group of alcohols, the alkanols of from 1 to 6 carbon atoms are of greatest interest.

The unique catalyst used in the new process are mixtures of at least one beta-alkoxycarboxylic acid and at least one alkali metal salt of such an acid. In such mixtures, there should not be present more than one mole of salt(s) per mole of acid(s). At least about 0.25 mole of salt(s) are present per mole of acid(s). Preferably the mixture contains from about 0.7 to about 0.8 mole of salt(s) per mole of acid(s).

The suitable acids are the beta-alkoxycarboxylic acids. Typical of this class of acids are beta-methoxypropionic acid, beta-ethoxypropionic acid, beta-ethoxyhydrocinnamic acid, beta-propoxy-alpha,alpha-dimethylpropionic acid, beta-isopropoxyisovaleric acid, beta-butoxybutyric acid, beta-methoxycaproic acid, beta-ethoxyadipic acid, beta-ethoxy-n-butylmalonic acid, beta-propoxypimelic acid, beta-methoxyvaleric acid, beta-butoxyglutaric acid, beta-methoxyazelaic acid and like monocarboxylic and dicarboxylic aliphatic acids. While the acid suitably may be polycarboxylic, the monocarboxylic acids are to be preferred. It is preferred that the acid contain not more than 20 carbon atoms. Preferably, the alkoxy group of these acids contains not more than about 6 carbon atoms. Because of their greater availability, the beta-alkoxypropionic acids are of greatest value. To reduce the number of different materials in the reaction zone, it is preferred that the catalyst comprise a mixture of but a single beta-alkoxy-propionic acid and a single alkali metal salt of that acid, and for the same reason, it is desirable that the alkoxy group of the beta-alkoxypropionic acid be the same as the alkoxy group of the alcohol to be reacted with the acrolein.

Suitable as the salt(s) used in the catalyst are one or more of the alkali metal, preferably potassium or sodium, salts of the foregoing acids.

While the mixture of acid and salt used as catalyst can be prepared in situ in the reaction zone—by separate addition of acid and salt to that zone—such a procedure requires much more careful control of the process variables than if the salt and acid are mixed outside the reaction zone and the mixture then fed to that zone. Consequently, the use of the pre-mixed acid-salt catalyst is to be preferred.

According to our new process, a beta-ether-substituted propionaldehyde is prepared by simply bringing together the alcohol and acrolein in the prsence of the catalyst and maintaining the resulting mixture under those conditions for a sufficient time to insure completion of the desired reaction.

It has been found that addition of the alcohol to acrolein goes forward most effectively at temperatures of from about 10° C. to about 60° C., although temperatures above and below this range may in some cases be employed. It has been found that reaction temperatures within the range of from about 25°C. to about 50° C., and particularly reaction temperatures of about 40° C. (e.g., from about 35° C. to about 45° C.) are especially desirable, inasmuch as it has been found that at these temperatures the desired reaction proceeds to completion at practically feasible rates, but that virtually no side reaction occurs. By conducting the reaction at about 40° C., it has been found that the acrolein is converted substantially quantitatively to the corresponding beta-ether substituted propionaldehyde as substantially the only product.

The reaction between the alcohol and the acrolein can be carried out at substantially atmospheric pressure, or moderately subatmospheric or superatmospheric pressures can be used, as may be desirable and convenient. When conducting the reaction within the preferred temperature range, use of substantially atmospheric pressure is usually most convenient.

Essential to substantially complete conversion of the acrolein to substantially only the desired ether-aldehyde product is the presence of an excess of the alcohol over the amount theoretically required to react with the acrolein charged. Theoretically, one mole of the alcohol reacts with one mole of the acrolein. It has been found necessary in the new process to supply at least 1.5 moles of alcohol per mole of acrolein present in the reaction mixture. Preferably, somewhat larger excesses of alcohol— e.g., 2.0 to 4.0 moles of alcohol, or even more, per mole of acrolein—are provided. Ordinarily, no commensurate additional advantage accrues from the use of more than about 20 moles of alcohol per mole of acrolein, and in most cases it will be found desirable to use not more than 10 moles of alcohol per mole of acrolein. Usually, it will be found that best results are obtained from the use of about 3—i.e., from about 2.5 to about 3.5—moles of alcohol per mole of acrolein.

Also essential to the desired reaction is the presence of a substantial amount of the catalyst. Thus, the concentration of catalyst in the reaction mixture must be at least about 1% of the total weight of that mixture, and preferably the catalyst concentration is at least 2% of the weight of the reaction mixture. Ordinarily, a catalyst concentration in excess of about 10% of the weight of the reaction mixture will be found undesirable, since a greater concentration of catalyst ordinarily does not result in additional advantages over lesser concentrations of catalyst, so that larger excesses of catalyst are economically unjustified. In most cases, a catalyst concentration of about 3 to 5% of the weight of the reaction mixture will be found to give optimum results.

It is preferred that the reaction mixture contain a minimum of water. While some water can be tolerated in the reaction mixture without causing significant amounts of undesirable side reactions, the presence of substantial amounts of water is undesirable, inasmuch as the water can react with acrolein to form hydracrylaldehyde. In the present invention, water serves no useful purpose. In view of this fact, and the fact that water can react with the acrolein, it is preferred that the reaction mixture be maintained in a substantially anhydrous condition. By this is meant that the amount of water in the reaction zone should not exceed about 15% of the weight of the reaction mixture and preferably is less than about 8.0% of the weight of the mixture. Desirably, the reaction mixture is completely free from water.

The order in which the alcohol and acrolein reactants are mixed is not in most cases critical. To insure a minimum of side-reactions, however, the acrolein should not come into contact with the catalyst unless the alcohol reactant is present. Thus, desirably, one of two techniques is used: in one, the acrolein is mixed with the alcohol and the catalyst added; in the other, the catalyst is mixed with the alcohol and the acrolein added, preferably slowly and to the thoroughly stirred reaction mixture to prevent local high concentration of the acrolein.

Preferably, molecular oxygen is excluded from the reaction zone—again to prevent undesirable side reactions involving the acrolein.

As will be evident from the foregoing description of the new process, that process can effectively and conveniently be conducted in either a batchwise or a continuous manner.

Upon completion of the reaction, the reaction mixture comprises the product ether-aldehyde, the catalyst, any water present, the excess alcohol used, and any unreacted acrolein. While any of the usual methods for separating two materials can be used to effect separation of the product ether-aldehyde, it normally will be found to be most convenient to distill the ether-aldehyde from the final reaction mixture. To minimize reversion of the ether-aldehyde, the "flashing" technique preferably is used— that is, the final reaction mixture is distilled rapidly at low pressure (and thus at low temperature) to remove the ether-aldehyde overhead, the catalyst remaining as bottoms product. Further purification of the ether-aldehyde, if necessary, again can be effected by any known method, but preferably is effected by distillation.

The foregoing constitutes a general description of the process of this invention. The following examples are set out for the purpose of illustrating application of that process in particular cases. It is to be understood that these examples are included only for the purpose of illustrating the invention, and are not to be considered as limiting the invention in any way not recited in the claims. In these examples, "parts" means parts by weight unless otherwise expressly set out.

*Example I*

A reaction mixture consisting of 753 parts of acrolein, 1871 parts of absolute ethanol, 210 parts of water, and 44 parts of beta-ethoxypropionic acid and 64 parts potassium beta-ethoxypropionate was held at 40° C. for 200 hours.

An aliquot portion of the above solution was subjected to flash distillation at 5 millimeters mercury pressure and 95° C. Analysis of the distillate showed that there had been obtained a 92 percent yield of beta-ethoxypropionaldehyde and an acrolein conversion of 86 percent.

*Example II*

To a mixture of 9.8 parts sodium hydroxide, 66 parts beta-ethoxypropionic acid, 100 parts of water and 910 parts absolute ethanol was added 360 parts of acrolein. The mixture was allowed to react at 40° C. for 107 hours. Part of the solution was treated with 50% sulfuric acid to a pH of 5.0 to precipitate the sodium ion as sodium sulfate. The filtrate was vacuum flashed at 10 millimeters mercury pressure. From the analysis of the products of the distillation, the yield of beta-ethoxypropionaldehyde was found to be 94%. Acrolein conversion was 87%.

Suitably, pure acrolein may be used in the process of the invention. Equally suitably, commercially available acrolein may be used. Such acrolein usually contains small amounts of ketones (particularly acetone), aldehydes (particularly acetaldehyde and propionaldehyde), and water. In effecting addition of an alcohol to the acrolein, according to our invention, both the ketones and the aldehydes are substantially inert. The beta-ether substituted propionaldehyde product can be separated from the resulting mixture by suitable known methods, such as distillation. The effect of water in the reaction mixture has already been discussed.

The beta-ether-propionaldehydes are readily oxidized to the corresponding beta-ether-propionic acids. Indeed, one of the major potential uses for these aldehydes is in the preparation of the acids. Accordingly, such beta-ether-propionic acids, and their salts, are readily available, and for use in our new process. Further, if a beta-ether-propionaldehyde prepared according to our new process, is to be oxidized to the corresponding acid, an additional advantage of our process makes itself evident—that is, the mixture of propionaldehyde and the acid used as the catalyst that is obtained by simple distillation of the reaction mixture resulting from performance of our process can be used directly in the preparation of the acid. We have found that the presence of the acid in the aldehyde feed does not deleteriously affect the subsequent oxidation of that aldehyde. It is thus unnecessary to separate the acid from the aldheyde before the aldehyde is oxidized.

The oxidation of the beta-ether-substituted propionaldehyde is readily effected in liquid phase, employing molecular oxygen as oxidizing agent and in the presence of a polyvalent metal oxidation catalyst. Suitable catalysts include any of the orthodox polyvalent metal oxidation catalysts, including one or more metals such as manganese, cobalt, copper, nickel, and the like, and their salts and other compounds. Of particular value are the compounds of cobalt such as the cobalt salts of organic acids—e.g., cobalt acetate, cobalt octoate, and the like. But a very small amount of catalyst—sufficient to provide an amount of metal in the order of about one to ten parts by weight per million parts by weight of the beta-ether-propionaldehyde—will be found sufficient in most cases, although in many cases somewhat larger amounts of catalyst can be used without adverse effect—and in some cases, even to advantage.

The oxidation is effected by simply contacting the beta-ether-propionaldehyde with a molecular oxygen-containing gas in the presence of the catalyst at a suitable temperature, which in most cases will be found to be of the order of about 40° C. to about 70° C. It is desirable, of course, that there be a substantial partial pressure of molecular oxygen in the reaction mixture, oxygen partial pressures of the order of 4–10 pounds per square inch being suitable in most cases. Yields of acid of the order of about 95% are usually obtained.

Thus, in a particular case a synthetic mixture of 12% by volume oxygen in nitrogen was sparged at the rate of 4 standard cubic feet per minute into the bottom of a column reactor into a column of beta-ethoxypropionaldehyde 8 feet high. The aldehyde was maintained at 50° C. The pressure was 40 pounds per square inch gauge. The aldehyde contained 1 part per million by weight of cobalt as cobalt octoate. Liquid residence time in the reactor was 4 hours. The exit gas contained 2.5% by volume of oxygen. The effluent product contained 65% by weight of beta-ethoxypropionic acid. Yield of the acid was approximately 95% of the aldehyde converted.

The acid formed was suitable for use directly in the formation of the catalyst to be employed for the further addition of ethanol to acrolein to form beta-ethoxypropionaldehyde.

It will be further evident, from the foregoing discussion, that we also have discovered a new and convenient process suitable for the large-scale continuous preparation of beta-ether-propionic acids from alcohols and acrolein. Such a process comprises two stages: in a first stage, an alcohol is reacted with acrolein in the presence of a catalyst comprising the mixture of at least one beta-alkoxy-carboxylic acid and at least one alkali metal salt thereof, to add the alcohol to the olefinic double bond and thereby form the corresponding beta-ether-substituted propionaldehyde, then passing the said propionaldehyde to a second zone, wherein it is oxidized to the corresponding beta-ether-substituted propionic acid, recovering said propionic acid, withdrawing a part of the recovered propionic acid, reacting a part of the withdrawn acid with an alkali metal base, and passing the resulting mixture of said propionic acid and alkali metal salt thereof to said phase to provide the necessary catalyst therein.

We claim as our invention:

1. A process for the preparation of beta-ether-substituted propionaldehydes, which process comprises bringing together in the liquid phase, in which the amount of water is less than about 15% of the weight of the reaction mixture, acrolein and an unsubstituted aliphatic alcohol containing from 1 to 25 carbon atoms and only carbon, oxygen and hydrogen atoms and free from acetylenic unsaturation, at a temperature of from about 10° to about 60° C. in the presence of, as catalyst, a mixture of at least one beta-alkoxymonocarboxylic acid containing not more than 20 carbon atoms and not more than about 6 carbon atoms in said alkoxy group and at least one alkali metal salt of such an acid, the said mixture of acid and salt containing not more than one mole of said salt per mole of said acid therein.

2. A process for the preparation of beta-ether-substituted propionaldehydes, which process comprises bringing together in the liquid phase, in which the amount of water is less than about 15% of the weight of the reaction mixture, acrolein and an unsubstituted aliphatic alcohol containing from 1 to 25 carbon atoms and only carbon, oxygen and hydrogen atoms and free from acetylenic unsaturation, at a temperature of from about 10° to about 60° C. in the presence of, as catalyst, a mixture of at least one beta-alkoxyalkanoic acid containing not more than 20 carbon atoms and not more than about 6 carbon atoms in said alkoxy group, and at least one alkali metal salt of such an acid, the said mixture of acid and salt containing not more than one mole of said salt per mole of said acid therein.

3. A process for the preparation of beta-ether-substituted propionaldehydes, which process comprises bringing together in the liquid phase, in which the amount of water is less than about 15% of the weight of the reaction mixture, acrolein and an unsubstituted aliphatic alcohol containing from 1 to 25 carbon atoms and only carbon, oxygen and hydrogen atoms and free from acetylenic unsaturation, at a temperature of from about 10° to about 60° C. in the presence of, as catalyst, a mixture of a beta-alkoxymonocarboxylic acid containing not more than 20 carbon atoms and not more than about 6 carbon atoms in said alkoxy group and an alkali metal salt of such an acid, the said mixture of acid and salt containing not more than one mole of said salt per mole of said acid therein.

4. A process for the preparation of beta-ether-substituted propionaldehydes, which process comprises bringing together in the liquid phase, in which the amount of water is less than about 15% of the weight of the reaction mixture, acrolein and an unsubstituted aliphatic alcohol containing from 1 to 25 carbon atoms and only carbon, oxygen and hydrogen atoms and free from acetylenic unsaturation, at a temperature of from about 10° to about 60° C. in the presence of, as catalyst, a mixture of a beta-alkoxyalkanoic acid containing not more than 20 carbon atoms and not more than about 6 carbon atoms in said alkoxy group and an alkali metal salt of such an acid, the said mixture of acid and salt containing not more than 1 mole of said salt per mole of said acid therein.

5. A process for the preparation of beta-ether-substituted propionaldehydes, which process comprises bringing together in the liquid phase, in which the amount of water is less than about 15% of the weight of the reaction mixture, acrolein and an unsubstituted primary monohydric aliphatic alcohol containing from 1 to 25 carbon atoms and only carbon, oxygen and hydrogen atoms and free from acetylenic unsaturation, at a temperature of from about 25° to about 50° C. in the presence of, as catalyst, a mixture of a beta-alkoxypropionic acid containing not more than about 6 carbon atoms in said alkoxy group and an alkali metal salt of such acid, the said mixture of acid and salt containing from about 0.25 to 1 mole of said salt per mole of said acid.

6. A process according to claim 5 wherein the alkoxy group of the said beta-alkoxypropionic acid is the same as the alkoxy group of the said alcohol.

7. A process for the preparation of beta-ether-substituted propionaldehydes, which process comprises bringing together in the liquid phase, in which the amount of water is less than about 15% of the weight of the reaction mixture, in a first reaction zone acrolein and an unsubstituted aliphatic alcohol containing from 1 to 25 carbon atoms and only carbon, oxygen and hydrogen atoms and free from acetylenic unsaturation, at a temperature of from about 10° to about 60° C. in the presence of, as catalyst, a mixture of at least one beta-alkoxymonocarboxylic acid containing not more than 20 carbon atoms and not more than about 6 carbon atoms in said alkoxy group, and at least one alkali metal salt of such an acid, the said mixture of acid and salt containing not more than one mole of said salt per mole of said acid therein, whereby there is formed a beta-ether-substituted propionaldehyde corresponding to said alcohol, passing at least a part of said propionaldehyde to a second reaction zone wherein it is reacted with a molecular oxygen-containing gas in liquid phase and in the presence of a polyvalent metal oxidation catalyst, whereby there is formed the beta-ether-substituted propionic acid corresponding to said propionaldehyde, passing a portion of said propionic acid to a third reaction zone wherein a part of said acid is reacted with an alkali metal base to form a mixture of said acid and alkali metal salt of said acid, and passing said acid-salt mixture to the first rection zone to provide the necessary catalyst therein.

8. A process for the preparation of beta-ether-substituted propionaldehydes, which process comprises bringing together in the liquid phase, in which the amount of water is less than about 8.0% of the weight of the reaction mixture, acrolein and an unsubstituted primary monohydric alkanol containing from 1 to 6 carbon atoms and only carbon, oxygen and hydrogen atoms, at a temperature of from about 35° to about 45° C. in the presence of, as catalyst, a mixture of a beta-alkoxypropionic acid containing not more than about 6 carbon atoms in said alkoxy group in which said alkoxy group of said acid is the same as the alkoxy group of said alkanol and an alkali metal salt of such acid, the said mixture of acid and salt containing from about 0.25 to 1 mole of said salt per mole of said acid therein.

References Cited in the file of this patent

UNITED STATES PATENTS

| 2,694,732 | McTeer et al. | Nov. 16, 1954 |
| 2,694,733 | McTeer et al. | Nov. 16, 1954 |

FOREIGN PATENTS

| 710,489 | Great Britain | June 16, 1954 |